(No Model.)
J. T. WEST.
Grain Drill.
No. 238,736.
Patented March 8, 1881.
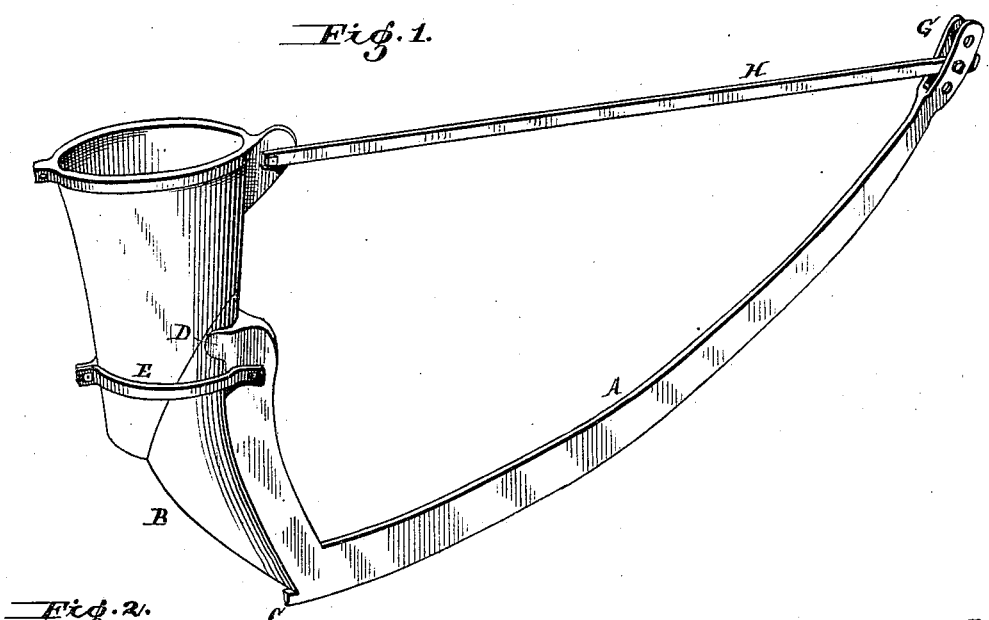
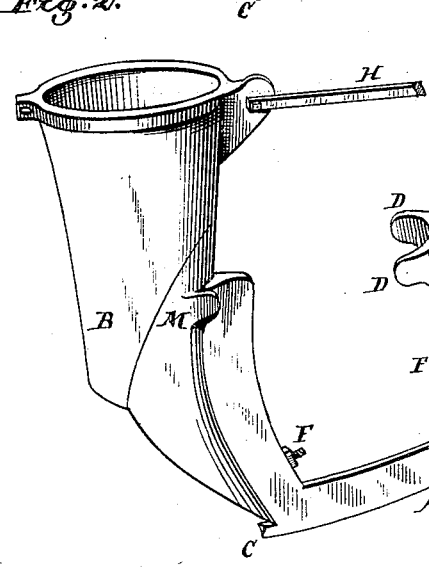
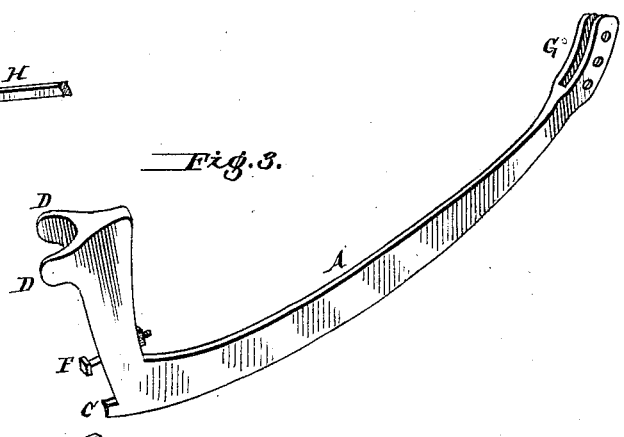

UNITED STATES PATENT OFFICE.

JOHN T. WEST, OF BOWLING GREEN, KENTUCKY.

GRAIN-DRILL.

SPECIFICATION forming part of Letters Patent No. 238,736, dated March 8, 1881.

Application filed December 11, 1880. (No model.)

*To all whom it may concern:*

Be it known that I, JOHN T. WEST, a citizen of the United States, residing at Bowling Green, in the county of Warren and State of Kentucky, have invented certain new and useful Improvements in Grain-Drills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to certain new and useful improvements in drags for converting plow or hoe grain-drills into drag or slide drills, the object of the invention being to provide simple and effective means to secure the attachment to the plows thereof of drags or slides of peculiar construction, which serve to prevent said plows from raking up or accumulating in front the trash and such loose material as may have been turned under the surface of the ground or left on the top. The drag or slide is capable of being attached to or removed from the plow, whereby the drill can readily be converted into a plow-drill or drag-drill, according to the nature of the soil to be worked.

In the drawings, Figure 1 is a perspective view of a grain-drill plow or hoe and drag-bar having my improved drag or slide attached thereto. Fig. 2 is a similar view, showing a plow having lugs, between which the drag is fitted. Fig. 3 is a detached view of the drag or slide.

The letter A designates a metallic drag or slide, which is made thick on its back or upper part and gradually tapers down toward the bottom or belly part, so as to form a thin smooth edge, which presses down the loose material that might be gathered by the plow and permits the plow to pass over it. The drag approximates in shape a quarter-segment of a circle, and its vertical or upright portion rests against or receives the front portion of the plow and grain-spout B. The heel of the drag is constructed with a shoulder or lug, C, which serves to receive and support the point of said plow, as is clearly shown in the drawings. The rear face of the vertical portion of the drag is curved, so as to conform to the curvature of the plow, and it may lie upon the front surface thereof, or else it may be made concave on its rear side, so that the plow may rest in said concavity, to prevent lateral movement and effect a firm connection of the respective parts. The upper end of the vertical portion of the drag is constructed with two rearwardly-projecting lugs, D, which extend on opposite sides of the plow, to assist in securing the latter to the drag.

When the plow does not rest in a drag having a concave seat in its back, I make use of two wrought-iron bands, E, which are secured to the drag by bolts or otherwise and embrace the plow-shank, being secured thereto or held thereon by a clamping-bolt passing through the rear ends of the band.

A bolt, F, passing through the plow, near the point thereof, and extending through the drag, will serve, in connection with the top lugs, to firmly secure the latter to the plow.

The forward portion of the drag forms an upwardly-extending arm, which is slotted or bifurcated at its upper end, as is shown at G, for the purpose of receiving the drag-bar H of the drill. The upper end of the plows is attached to a series of these bars H, in the customary manner. A series of holes made in the upper bifurcated end of the drag serve, in connection with a transverse bolt, to adjustably fasten the drag to the bar H.

It will readily be perceived that the drag is secured to the plow in such manner that it can readily be applied thereto and detached therefrom. I have described various ways for attaching the same to the plow, but desire it to be understood that in every instance I construct the drag with a lug at its heel for supporting the point of the plow.

It has already been stated that the drag is particularly designed for use in trashy or loose ground, for preventing the plows from raking up or gathering material, &c., which would tend to clog and destroy its effectiveness. In the present instance the weight of the drag, together with that of the plow and drag-bar of the drill, will be sufficient to force the heel and belly of the drag into the ground to such a depth as will be necessary for the proper seeding of the grain. The sides of the steel point of the plow will tear down the furrow thus pressed open by the drag, so that the grain will be covered, as is done by the drill when the drags are not employed.

While the drags are specially designed for use in loose trashy land, they may also be used in baked or hard ground by exerting pressure thereon through the medium of suitable weights applied to the drag-bars or by the application of spring or other pressure.

Instead of constructing the drag with lugs overlapping the plow, the latter may be formed with lugs M, located at any suitable height on the plow, and receiving the drag between the same, so as to prevent the lateral displacement thereof.

It will be apparent that the fastening-bolt for effecting an intimate connection of the drag with the plow must generally be employed, this bolt, as has already been stated, passing through the point of the plow and extending through the rear of the drag to the front side thereof, where it is secured by a nut. The drag, however, may be secured to the plow by other means than this bolt.

It is possible to secure the drag to the plow by dispensing with the lugs on either drag or plow and making use of the bands or clip alone. In some instances the drag is attached to the frame of the drill or planter, or its upper end may be curved back and be attached to the top of the plow. If thought expedient, the bottom of the drag need only be attached to the plow, its upper end being left free.

Having thus described my invention, what I claim as new, and desire to secure by Letters Patent, is—

1. The drag for drill-plows, consisting of a vertical rear portion adapted to rest against or receive the body of said plow, and having a lug or shoulder at its heel for supporting the point of the plow, and a curved body tapering toward its bottom or belly portion, substantially as and for the purpose set forth.

2. The combination of the drag having a vertical portion provided with top lugs and a shoulder at its heel, and a curved upwardly-projecting body portion bifurcated at its upper end, with the plow, a bolt passing through the latter and the drag, and the drag-bar, substantially as and for the purpose set forth.

In testimony whereof I affix my signature in presence of two witnesses.

JOHN T. WEST.

Witnesses:
J. F. BLEWETT,
F. G. MCKAY.